United States Patent
Ahouanto et al.

(10) Patent No.: US 10,953,702 B2
(45) Date of Patent: *Mar. 23, 2021

(54) ADAPTER FOR A ROLLING ASSEMBLY AND ROLLING ASSEMBLY COMPRISING SAME

(71) Applicant: COMPAGNIE GENERALE DES ETABLISSEMENTS MICHELIN, Clermont-Ferrand (FR)

(72) Inventors: Michel Ahouanto, Enval (FR); Bertrand Daval, Clermont-Ferrand (FR); Arthur Topin, Clermont-Ferrand (FR); Jacky Pineau, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 677 days.

This patent is subject to a terminal disclaimer.

(21) Appl. No.: 15/573,792

(22) PCT Filed: May 3, 2016

(86) PCT No.: PCT/EP2016/059830
§ 371 (c)(1),
(2) Date: Nov. 13, 2017

(87) PCT Pub. No.: WO2016/180667
PCT Pub. Date: Nov. 17, 2016

(65) Prior Publication Data
US 2018/0147896 A1 May 31, 2018

(30) Foreign Application Priority Data
May 12, 2015 (FR) ...................... 1554218

(51) Int. Cl.
*B60C 15/02* (2006.01)
*B60C 5/16* (2006.01)
(Continued)

(52) U.S. Cl.
CPC ............ *B60C 15/0209* (2013.01); *B60B 5/02* (2013.01); *B60B 25/08* (2013.01); *B60C 5/16* (2013.01);
(Continued)

(58) Field of Classification Search
CPC ..... B60C 15/00; B60C 15/02; B60C 15/0209; B60C 5/16
See application file for complete search history.

(56) References Cited

U.S. PATENT DOCUMENTS 4,373,567 A 2/1983 Declercq
6,626,217 B2 9/2003 Bestgen
(Continued)

FOREIGN PATENT DOCUMENTS

GB 2 085 375 4/1982
WO WO 00/78565 12/2000
WO WO 2014/005970 1/2014

*Primary Examiner* — Justin R Fischer
(74) *Attorney, Agent, or Firm* — Cozen O'Connor

(57) ABSTRACT

Adapter for a rolling assembly intended to be fitted to a passenger vehicle, with improved mountability and a high capacity for absorbing large deformations in the event of pinch shocks. The adapter has reinforcing element (15) of the axially outer end (9) wholly situated axially on the outside of bearing face (21) and radially on the outside of adapter seat (18), and a main reinforcement (17) having a radial superposition of at least two layers of reinforcers, the reinforcers being mutually parallel within one and the same layer and crossed with one another from one layer to the next. Each of the layers of main reinforcement (17) comprises reinforcers which make, with a circumferential direction (XX') of the tire, an angle at least equal to 30°, and (Continued)

coated with a polymer material having an elastic modulus at 10% elongation at most equal to 70 MPa.

10 Claims, 2 Drawing Sheets

(51) Int. Cl.
    *B60B 5/02*          (2006.01)
    *B60B 25/08*       (2006.01)
    *B60C 9/02*         (2006.01)

(52) U.S. Cl.
    CPC . *B60B 2900/351* (2013.01); *B60C 2009/0276* (2013.01)

(56) References Cited

U.S. PATENT DOCUMENTS

| | | | |
|---|---|---|---|
| 2005/0222318 A1* | 10/2005 | Chauvin | C08K 3/04 524/496 |
| 2012/0211138 A1* | 8/2012 | Johnson | B60C 15/0635 152/526 |
| 2016/0001609 A1 | 1/2016 | Kollias | |

* cited by examiner

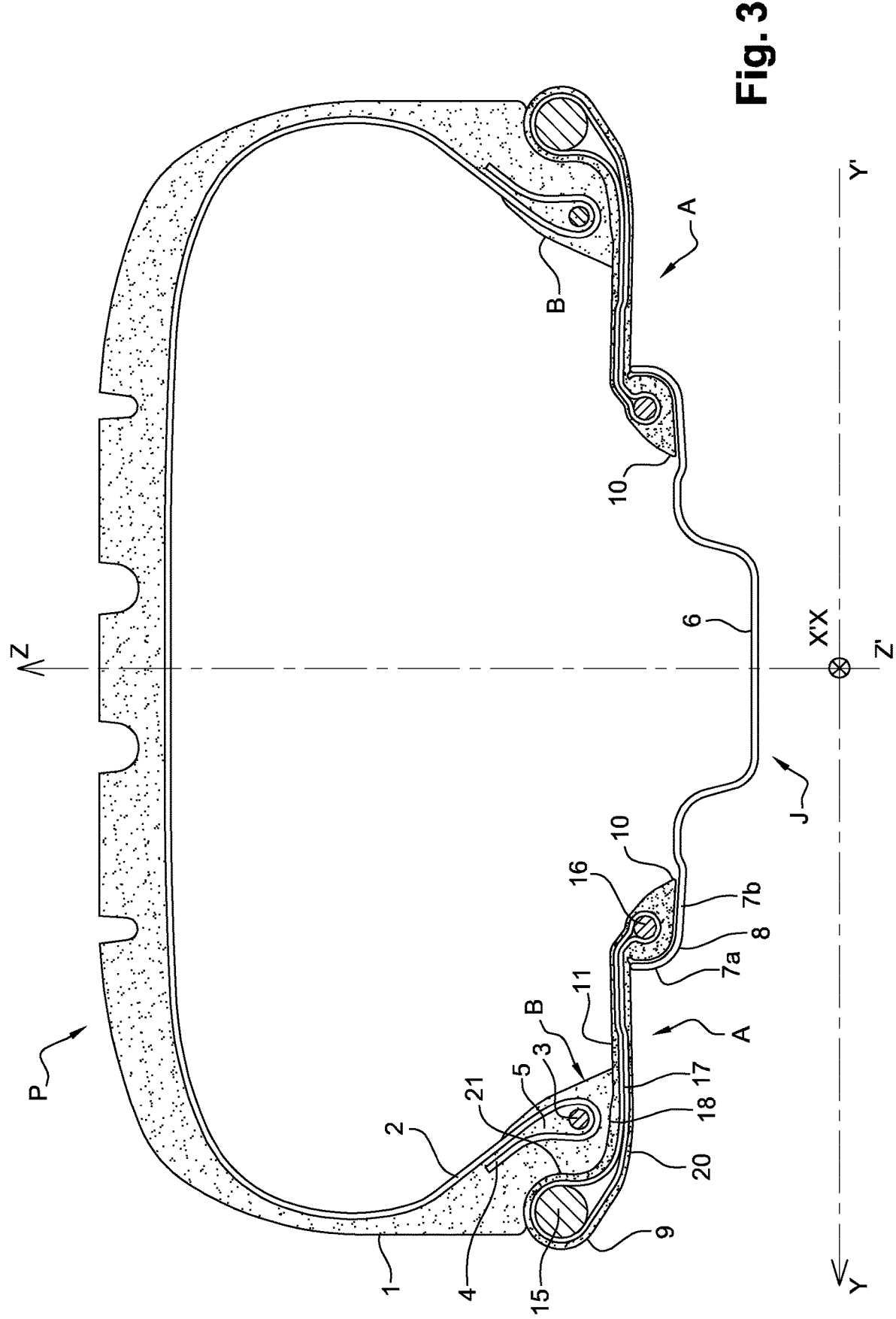

ADAPTER FOR A ROLLING ASSEMBLY AND ROLLING ASSEMBLY COMPRISING SAME

RELATED APPLICATIONS

This is a U.S. National Phase Application under 35 USC 371 of International Application PCT/EP2016/059830 filed on May 3, 2016.

This application claims the priority of French application no. 1554218 filed May 12, 2015, the entire content of which is hereby incorporated by reference.

The invention is related to an adapter for a rolling assembly to be fitted to a passenger vehicle. The invention is also related to the said rolling assembly, made up of a tire, a rim and two adapters providing the connection between the two beads of the tire and the rim.

BACKGROUND OF THE INVENTION

Because a tire is a toric structure having, as axis of revolution, its axis of rotation, it can be described in a radial plane passing through its axis of rotation. In what follows, for any radial plane, the radial, axial and circumferential directions denote the directions perpendicular to the axis of rotation of the tire, parallel to the axis of rotation of the tire and perpendicular to the radial plane, respectively. The equatorial plane refers to the plane passing through the middle of the tread and perpendicular to the axis of rotation of the tire. Any section through the tire along a radial plane is referred to as a radial section.

In general, a tire comprises a tread, intended to come into contact with the ground, two sidewalls extending the axial ends of the tread radially inwards, and two beads extending the two sidewalls radially inwards and intended to come into contact with a rim.

Document WO 00/78565 proposes inserting an elastic adapter between a tire bead and a rim. Such an adapter comprises, axially from the inside towards the outside, an axially inner end referred to as adapter bead, comprising an inner reinforcing element and intended to attach the adapter to the rim, an axially outer end comprising an outer reinforcing element and intended to accept a bead of a tire, and a body connecting the two respectively axially inner and axially outer ends. The outer reinforcing element comprises a substantially radial first portion situated on the inside of the axially outer end, and a substantially axial second portion situated on the inside of the body, the first and second portions being substantially perpendicular to one another and forming a continuous assembly.

Such an adapter allows a tire to be mounted on a rim that is narrower than the one recommended by the usual standards, such as, for example, the ETRTO (European Tire and Rim Technical Organization) standard.

A rolling assembly equipped with an adapter as described in the aforementioned document performs the main functions of a conventional rolling assembly, in which the tire is mounted directly on its recommended rim, and notably guarantees a drift thrust response when a drift angle is applied, namely when a rotation about a radial direction is applied, with enough flexibility to avoid any damage to the rolling assembly.

However, such an adapter of the prior art does not have enough deformability to be able to absorb large deformations generated by impacts that the rolling assembly might experience against obstacles, such as kerbs, or in holes formed in the roadway, such as potholes. This type of impact is commonly referred to as "pinch shock".

Furthermore, the adapter of the aforementioned prior art is not very easy to fit, which means to say to mount between the tire and the rim. By way of example, in the case of a rolling assembly comprising a single adapter providing the connection between a first bead and the rim, the second bead, axially opposite to the first bead, being mounted directly on the rim, the mounting procedure is as follows. In a first step, the axially inner end of the adapter is mounted on the rim. In a second step, before the first bead of the tire is mounted at the axially outer end of the adapter, the adapter needs to be deformed in a substantially axial direction so as to allow the second bead to be mounted directly on the rim. Now, the outer reinforcing element, and in particular the substantially axial second portion thereof that is on the inside of the body, axially stiffens the body near the axially outer end and thus limits the axial deformation of the adapter, and this may impede the mounting of the second bead directly on the rim.

SUMMARY OF THE INVENTION

One object of the present invention is to improve the ease with which an adapter for a rolling assembly, intended to connect a tire bead to a rim, can be mounted, while at the same time ensuring that the adapter has a large capacity for absorbing large deformations in the event of pinch shocks.

One aspect of the invention is directed to an adapter for a rolling assembly, the said rolling assembly having an axis of rotation and comprising a tire having two beads, a rim having two rim bead seats and two adapters each intended to provide the connection between one of the beads and the rim, the said adapter comprising:
an axially inner end intended to be mounted on a rim bead seat and comprising an inner reinforcing element and a substantially radial axially outer face, an axially outer end intended to come into contact with a bead and comprising an outer reinforcing element and a substantially radial axially inner face or bearing face,
a substantially axial body connecting the said axially outer end to the said axially inner end so as to form a single piece,
the body comprising at least a main reinforcement providing the connection between the outer reinforcing element and the inner reinforcing element, the main reinforcement comprising at least one layer of mutually parallel reinforcers,
the body comprising an adapter seat intended to receive the bead and situated near the axially outer end,
the reinforcing element of the axially outer end being wholly situated axially on the outside of the bearing face and radially on the outside of the adapter seat,
the main reinforcement comprising a radial superposition of at least two layers of reinforcers, the said reinforcers being mutually parallel within one and the same layer and crossed with one another from one layer to the next,
and each of the layers of the main reinforcement of the body comprising reinforcers forming, with a circumferential direction of the tire, an angle at least equal to 30° and coated with a polymer material having an elastic modulus at 10% elongation at most equal to 70 MPa.

One feature of an adapter, according to an embodiment of the invention, is an outer reinforcing element positioned axially wholly on the outside of the bearing face, and therefore on the outside of the adapter body. As a result, the outer reinforcing element does not axially stiffen the body and therefore does not limit the axial deformability thereof.

Another feature is a main reinforcement comprising a radial superposition of at least two layers of reinforcers, the said reinforcers being mutually parallel within one and the same layer and crossed with one another from one layer to the next and each layer being made up of reinforcers which make, with the circumferential direction, an angle at least equal to 30°, these reinforcers being coated with a polymer material having an elastic modulus at 10% elongation at most equal to 70 MPa.

The main reinforcement is, in effect, made up of the winding of a layer of reinforcers respectively around the outer reinforcing element and the inner reinforcing element. This results in a radial superposition of at least two layers in the body: two layers if there is no superposition of the ends of the winding, 3 layers if there is some superposition of the ends of the winding. The angle formed by the reinforcers of a layer, with the circumferential direction, is given in terms of absolute value in the knowledge that, given the principle of manufacture adopted for the main reinforcement, the sign of the angle reverses when passing from one layer to the next.

Having a minimum threshold value for the angle of the reinforcers ensures the adapter has a minimal axial stiffness needed for the cornering stiffness expected of the rolling assembly. Having an elastic modulus at 10% elongation for the polymer coating material that is below a maximum threshold value guarantees the axial deformability of the adapter.

The combination of these features thus makes it possible to have an adapter that is axially supple enough that it can be fitted with ease, together with a good ability to absorb large deformations in the event of pinch shocks.

According to one preferred embodiment, the reinforcers of the layers of the main reinforcement form, with the circumferential direction of the tire, an angle at least equal to 35° and at most equal to 50°.

Below 35° and as the angle nears 0°, the inventors have found that the adapter has insufficient dimensional stability. The axial width of the adapter will in fact increase under the effect of the tire inflation pressure, because of the fact that the tensions generated in the adapter are reacted only in the non-main direction.

Above 50° and as the angle nears 90°, there is a reduction in the torsional stiffness of the adapter and, as a result, a loss of cornering stiffness of the rolling assembly as compared with a standard rolling assembly without an adapter.

Advantageously, the reinforcers of each of the layers of the main reinforcement of the body comprise a textile material such as an aromatic polyamide or aramid, an aliphatic polyamide or nylon, a polyester such as a polyethylene terephthalate (PET) or a polyethylene naphthenate (PEN), a polyketone or a cellulose-based textile material such as rayon.

Advantageously also, the reinforcers of each of the layers of the main reinforcement of the body comprise a combination of at least two distinct textile materials. Such reinforcers are referred to as hybrid reinforcers.

The polymer material with which the reinforcers of the layers of the main reinforcement are coated is more preferably still an elastomeric compound.

The main reinforcement of the said body may have an extension elastic modulus greater than or equal to 4 GPa.

With the body having an axial width L, measured between the axially inner face of the axially outer end and the axially outer face of the axially inner end, the axial width L of the body is advantageously at least equal to 2.54 cm and at most equal to 8 cm.

For preference, the axial width L of the body is at least equal to 3.17 cm and at most equal to 5.10 cm.

As far as the axially outer end of the adapter is concerned, the outer reinforcing element may, by way of nonlimiting example, be made of metal such as steel, of aliphatic polyamide such as nylon, of aliphatic polyamide such as aramid, of polyester such as polyethylene terephthalate (PET). It may also have a composite structure comprising a resin matrix reinforced with reinforcing fibres such as, for example, fibres made of nylon, aramid, polyethylene terephthalate (PET), polyethylene naphthalate (PEN), polyvinyl alcohol (PVA), rayon, glass, carbon, basalt.

Another subject aspect of the invention is directed to a rolling assembly comprising, for each bead of the tire, an adapter according to any one of the embodiments of the invention which have been described hereinabove.

According to a first alternative form, the rolling assembly according to an embodiment of the invention comprises a first and a second adapter having bodies of different axial widths L. The adapters are then said to be asymmetrical.

According to a preferred second alternative form, the rolling assembly according to an embodiment of the invention comprises a first and a second adapter having bodies of identical axial widths L. The adapters are then said to be asymmetrical.

It is possible for the rolling assembly to comprise just one adapter, positioned on just one side of the rim, and preferably on the outboard side of the vehicle. In this case, the rim has an asymmetrical geometric shape so as to adapt to the presence of the adapter present on just one side.

BRIEF DESCRIPTION OF THE DRAWINGS

The invention is described hereinbelow with reference to FIGS. 1 to 3, which are not necessarily drawn to scale, and given merely by way of illustration:

FIG. 3: radial section of a rolling assembly comprising two adapters according to an embodiment of the invention.

DETAILED DESCRIPTION OF THE DRAWINGS

Figure 1:
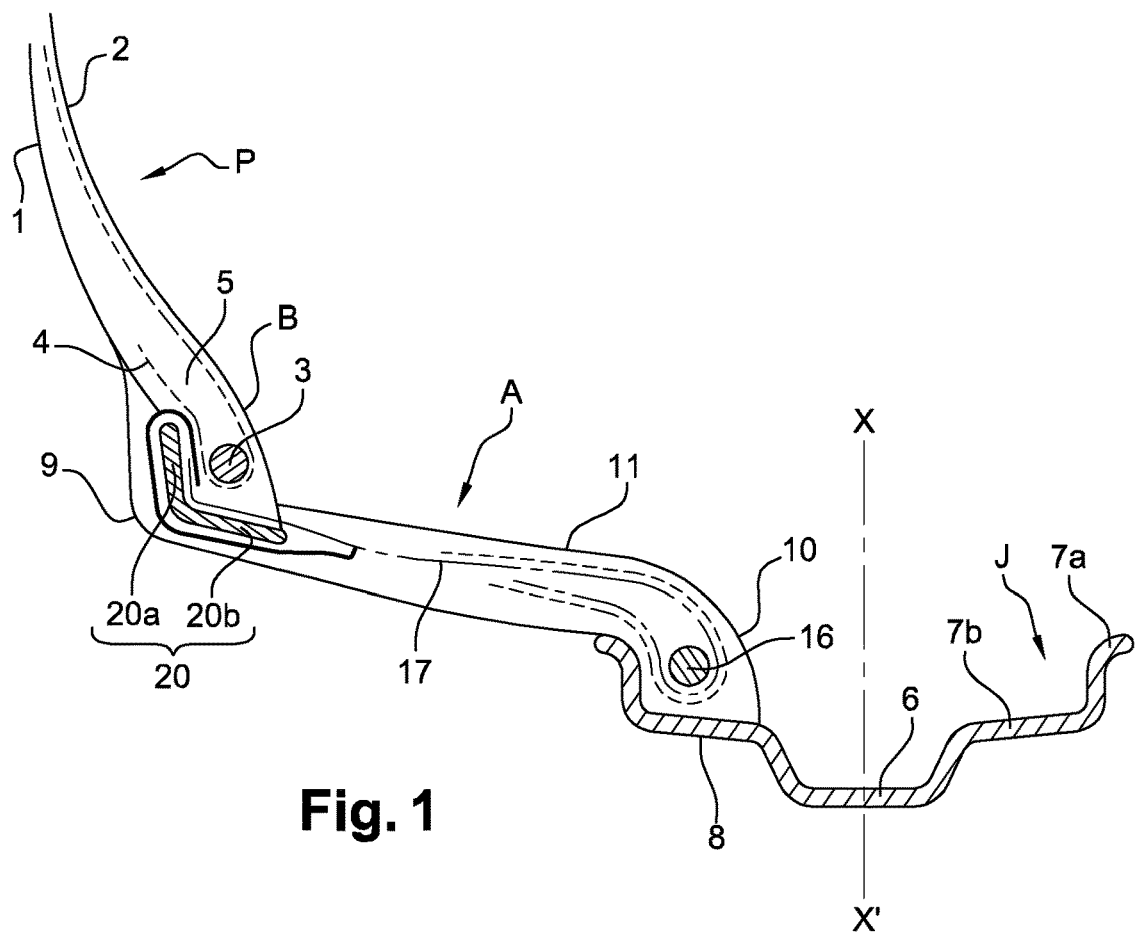
FIG. 1: radial section of an adapter of the prior art mounted on a rolling assembly.

FIG. 1 depicts a radial section of an adapter of the prior art mounted on a rolling assembly. The adapter A is positioned between the bead B of a tire P (depicted in part) and a rim J. The partial radial section of the tire P mainly exhibits a sidewall 1 and the carcass reinforcement 2 wrapped around a bead wire 3 to form a turnup 4 separated from the carcass reinforcement 2 by a filling element 5. The bead B of the tire P bears against the adapter A. The rim J comprises, in a middle portion, a mounting well 6, intended to make it easier to mount the bead B of the tire P and, at its axial ends, two rim bead seats 8, each one comprising a substantially radial portion or rim flange 7*a* and a substantially axial portion or rim seat 7*b*.

The adapter A of the prior art of FIG. 1 comprises:
an axially inner end 10 intended to be mounted on a rim bead seat 8 and comprising an inner reinforcing element 16, an axially outer end 9 intended to come into contact with a bead B and comprising an outer reinforcing element 20 comprising a substantially radial portion 20a and a substantially axial portion 20b, a substantially axial body 11 connecting the said axially outer end 9 to the said axially inner end 10 so as to form a single piece, the body 11 comprising at least a main reinforcement 17 providing the connection between the outer reinforcing element 20 and the inner reinforcing element 16, the main reinforcement 17 comprising at least one layer of mutually parallel reinforcers.

Figure 2:
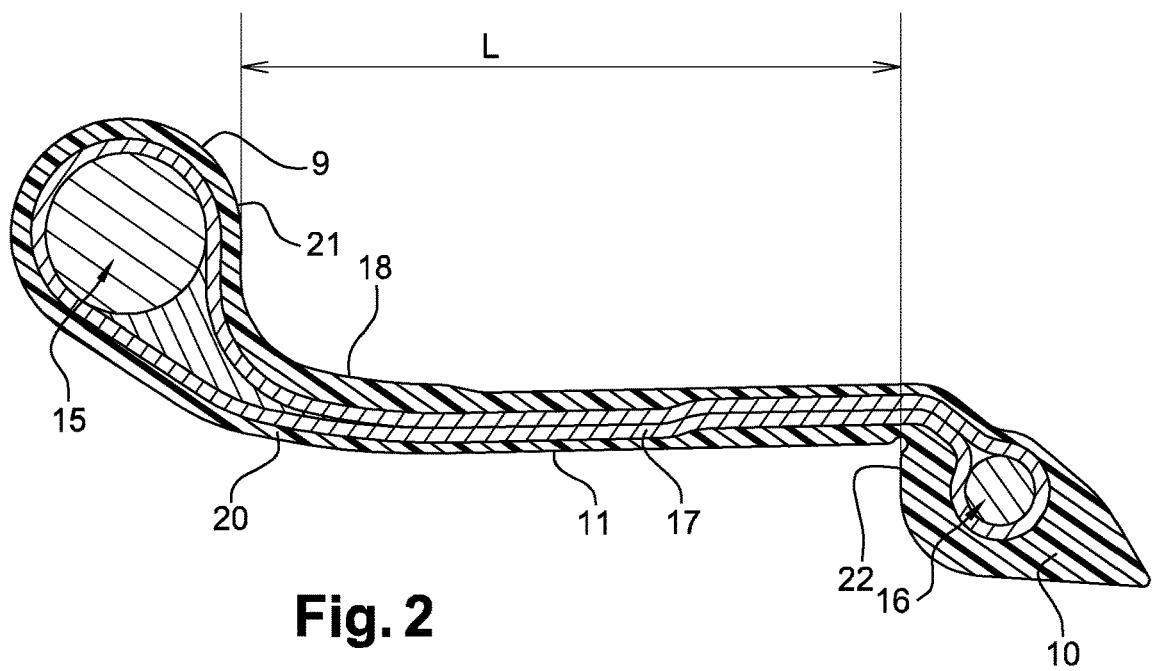
FIG. 2: radial section of an adapter according to an embodiment of the invention not mounted on a rolling assembly.

FIG. 2 depicts a radial section of an adapter according to the invention not mounted on a rolling assembly. This adapter comprises an axially outer end 9 comprising an outer reinforcing element 15, an axially inner end 10 comprising an inner reinforcing element 16, and a body 11 comprising a main reinforcement 17. The main reinforcement 17 is made up of a single reinforcing layer which is wound respectively around the inner reinforcing element 16 of the axially inner end 10 and around the outer reinforcing element 15 of the axially outer end 9. In the body 11, the main and return portions of the said reinforcing layer thus constitute a substantially radial stack of at least two reinforcing layers. The main reinforcement 17 is enveloped in a layer of elastomeric material 20. The body 11 further comprises an adapter seat 18 which is intended to come into contact with a tire bead. The body 11 has an axial width L, measured between the axially inner face 21 of the axially outer end 9 and the axially outer face 26 of the axially inner end 10. The body 11 also comprises an annular seat reinforcer 19 radially on the outside of the main reinforcement 17 and axially on the inside of the axially outer end 9. The outer reinforcing element 15, the radial section of which is depicted schematically in the form of a hatched disc, does not necessarily have a solid radial section: the hatched disc represents the envelope of the outer reinforcer 15, not the internal structure thereof.

FIG. 3 shows a radial section, in a plane YZ, of a rolling assembly comprising a tire P, a rim J, and, for each bead B, an adapter A providing the connection between the bead B and the rim J. The tire P comprises a tread (unreferenced) extended radially towards the inside by two sidewalls 1, themselves extended radially towards the inside by two beads B. Within each bead B, the carcass reinforcement 2 is turned up around a circumferential reinforcing element or bead wire 3 to form a turnup 4 separated from the carcass reinforcement 2 by a filling element 5. The rim J comprises, in a middle portion, a mounting well 6, intended to make it easier to mount the beads B of the tire P and, at its axial ends, two rim bead seats 8, each one comprising a substantially radial portion or rim flange 7a and a substantially axial portion or rim seat 7b. The adapter A comprises an axially inner end 10 comprising an inner reinforcing element 16 and intended to be mounted on a rim bead seat 8, an axially outer end 9 comprising an outer reinforcing element 15 and intended to come into contact via a substantially radial axially inner face or bearing face 21 with a bead B, and finally a body 11, connecting the axially outer end 9 to the axially inner end 10 so as to form a single piece, and comprising at least one main reinforcement 17 providing the connection between the outer reinforcing element 15 and the inner reinforcing element 16, and comprising a substantially axial adapter seat 18 intended to come into contact with a bead B.

More generally, the main reinforcement of the adapter may be made of an orthotropic material having a main direction of maximum stiffness making an angle at least equal to 30° with the circumferential direction.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A rolling assembly having an axis of rotation and comprising a tire having two beads, a rim having two rim bead seats and two adapters each configured to provide the connection between one of the beads and the rim, the adapter comprising:

an axially inner end configured to be mounted on a rim bead seat and comprising an inner reinforcing element and a substantially radial axially outer face;

an axially outer end configured to come into contact with one of the beads and comprising an outer reinforcing element and a substantially radial axially inner face or bearing face;

a substantially axial body connecting said axially outer end to said axially inner end so as to form a single piece;

said substantially axial body comprising at least a main reinforcement providing the connection between the outer reinforcing element and the inner reinforcing element, the main reinforcement comprising at least one layer of mutually parallel reinforcers, each at least one layer being wound respectively around the inner reinforcing element of the axially inner end and around the outer reinforcing element of the axially outer end, and in the body, main and return portions of the at least one layer contact one another at a midpoint of the body, so as to constitute, at least at the midpoint, a radial stack of at least two reinforcing layers;

said substantially axial body comprising an adapter seat configured to receive said one of the beads and situated near the axially outer end, wherein the reinforcing element of the axially outer end is wholly situated axially on the outside of the bearing face and radially on the outside of the adapter seat, wherein the main reinforcement comprises a radial superposition of at least two layers of reinforcers, said reinforcers being mutually parallel within one and the same layer and crossed with one another from one layer to the next, and wherein each of the layers of the main reinforcement of said substantially axial body comprises reinforcers which make, with a circumferential direction of the tire, an angle at least equal to 30°, and coated with a polymer material having an elastic modulus at 10% elongation at most equal to 70 MPa.

2. The rolling assembly according to claim 1, wherein the reinforcers of the layers of the main reinforcement form, with the circumferential direction of the tire, an angle at least equal to 35° and at most equal to 50°.

3. The rolling assembly according to claim 1, wherein the reinforcers of each of the layers of the main reinforcement of said substantially axial body comprise a textile material such as an aromatic polyamide or aramid, an aliphatic polyamide or nylon, a polyester such as a polyethylene terephthalate or a polyethylene naphthenate, a polyketone or a cellulose-based textile material such as rayon.

4. The rolling assembly according to claim 3, wherein the reinforcers of each of the layers of the main reinforcement of the body comprise a combination of at least two distinct textile materials.

5. The rolling assembly according to claim 1, wherein the polymer material with which the reinforcers of the layers of the main reinforcement are coated is an elastomeric compound.

6. The rolling assembly according to claim 1, said substantially axial body having an axial width L, measured between the axially inner face of the axially outer end and the axially outer face of the axially inner end, wherein the axial width L of said substantially axial body is at least equal to 2.54 cm and at most equal to 8 cm.

7. The rolling assembly according to claim 6, wherein the axial width L of said substantially axial body is at least equal to 3.17 cm and at most equal to 5.10 cm.

8. The rolling assembly according to claim 1, wherein an adapter is provided for each of said beads of the tire.

9. The rolling assembly according to claim 8 comprising a first and a second adapter having a plurality of said substantially axial bodies of identical axial widths L.

10. A rolling assembly comprising, for each of said beads of the tire, an adapter for a rolling assembly, the rolling assembly having an axis of rotation and comprising a tire having two beads, a rim having two rim bead seats and two adapters each configured to provide the connection between one of the beads and the rim, the adapter comprising:

an axially inner end configured to be mounted on a rim bead seat and comprising an inner reinforcing element and a substantially radial axially outer face;

an axially outer end configured to come into contact with one of the beads and comprising an outer reinforcing element and a substantially radial axially inner face or bearing face;

a substantially axial body connecting said axially outer end to said axially inner end so as to form a single piece;

said substantially axial body comprising at least a main reinforcement providing the connection between the outer reinforcing element and the inner reinforcing element, the main reinforcement comprising at least one layer of mutually parallel reinforcers;

said substantially axial body comprising an adapter seat configured to receive said one of the beads and situated near the axially outer end, wherein the reinforcing element of the axially outer end is wholly situated axially on the outside of the bearing face and radially on the outside of the adapter seat, wherein the main reinforcement comprises a radial superposition of at least two layers of reinforcers, said reinforcers being mutually parallel within one and the same layer and crossed with one another from one layer to the next, and wherein each of the layers of the main reinforcement of said substantially axial body comprises reinforcers which make, with a circumferential direction of the tire, an angle at least equal to 30°, and coated with a polymer material having an elastic modulus at 10% elongation at most equal to 70 MPa, the rolling assembly comprising a first and a second adapter having a plurality of said substantially axial bodies of different axial widths L.

\* \* \* \* \*